United States Patent [19]

Ballyns et al.

[11] Patent Number: 4,993,470
[45] Date of Patent: Feb. 19, 1991

[54] LATCH FOR POWERED DOOR ASSEMBLY

[75] Inventors: Jan Ballyns, Pickering; John C. Martin; Paul H. Martin, both of Toronto, all of Canada

[73] Assignee: Diesel Equipment Limited, Toronto, Canada

[21] Appl. No.: 378,160

[22] Filed: Jul. 11, 1989

Related U.S. Application Data

[62] Division of Ser. No. 92,571, Sep. 2, 1987, Pat. No. 4,860,813.

[51] Int. Cl.$^5$ ............................................. E05B 11/00
[52] U.S. Cl. .................................... 160/193; 292/11; 292/207; 24/611; 24/657
[58] Field of Search ..................... 160/193; 292/54, 11, 292/207, Dig. 36; 24/657, 609, 611

[56] References Cited

U.S. PATENT DOCUMENTS 2,446,951 8/1948 Quilter .................................. 24/609
2,629,156 2/1953 Kamers et al. .......................... 24/657
4,740,020 4/1988 Williams ........................... 24/657 X Primary Examiner—Blair M. Johnson
Attorney, Agent, or firm—Fetherstonhaugh & Co.

[57] ABSTRACT

A roll-up door for a container body of a van or the like is provided with a winch which is located in a compartment formed in the header of the door. The winch is connected by flexible winding straps to the upper door panel and the lower door panel so that it is operable to drive the door between the open and closed position. The door panels are hingedly connected by hinges in which the hinge pin is located at the inner face of the door. Flexible sealing members are connected to each jamb and bear against a marginal edge portion of the outer face of the door when the door is in the closed position. A control system for controlling the direction of rotation of the reversible D.C. motor is provided which includes a master control circuit and a slave control circuit which is selectively operable. The control circuit permits the movement of the door to be arrested at any time and to be reversed at any time by operating the master control and allowing similar control by means of the slave control when it is activated.

9 Claims, 7 Drawing Sheets

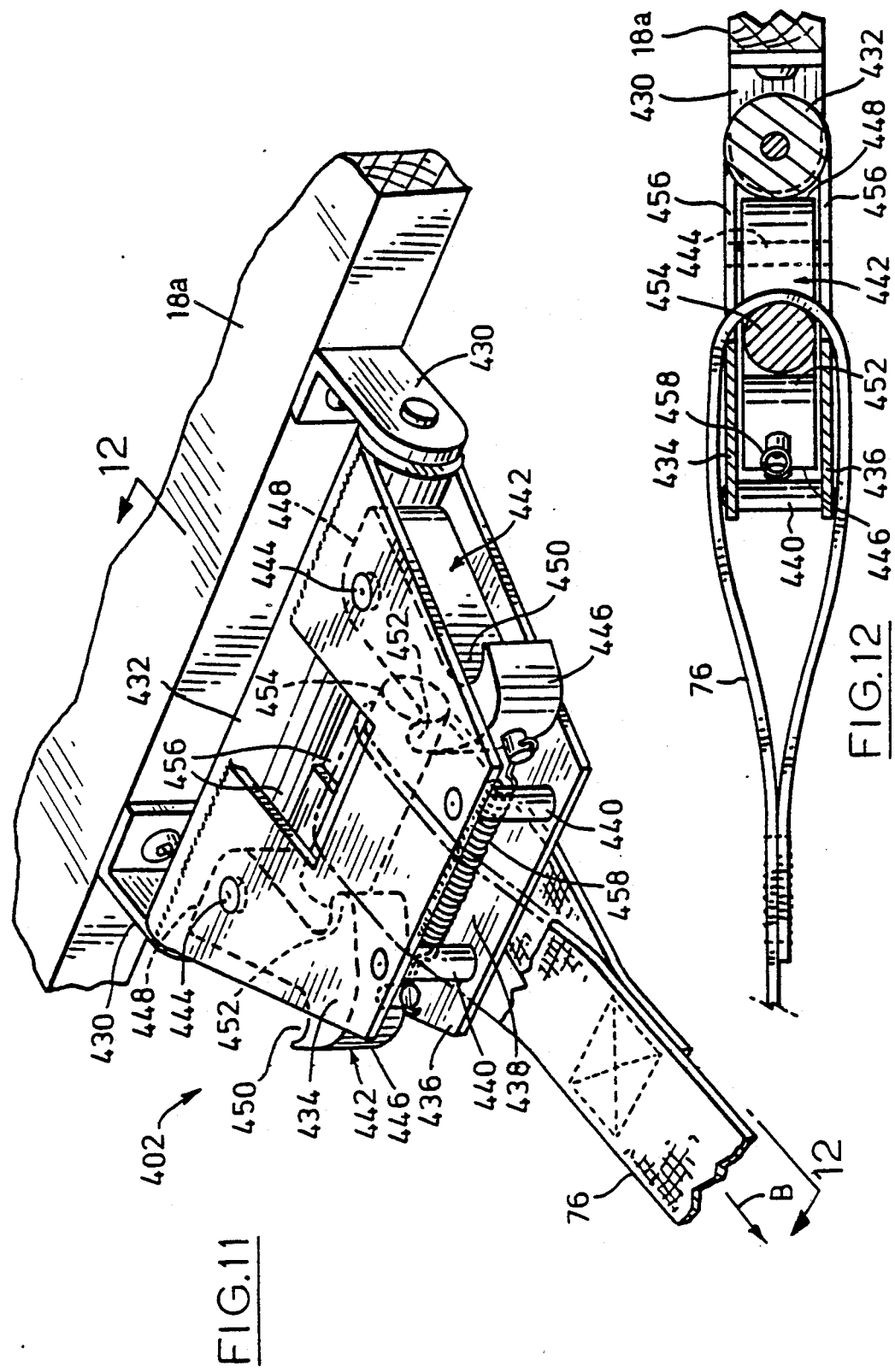

LATCH FOR POWERED DOOR ASSEMBLY

This application is a division of application Ser. No. 092,571 filed Sept. 2, 1987, now U.S. Pat. No. 4,860,813.

This invention relates to roll-up doors for cargo vehicles such as trucks, vans and the like.

In roll-up type doors used for closing the loading doorway of trucks, vans or the like, it has been common practice to provide a mechanism which will assist the manual opening of the door. In one such mechanism, a torsion spring is mounted on a shaft which is located in the header cavity found between the header and the path along which the door is driven when it is being raised. This mechanism only provides an assistance during the opening of the door and it acts as somewhat of a resistance to the closing of the door. It is not a mechanism which acts to power the door to an open position or a closed position.

The doors which are used on vans and trucks and the like can be relatively heavy in weight, particularly when the door is constructed to provide security against theft. For this reason, attempts have been made to provide a powered door which can be driven between its open and its closed position by a power source mounted within the container body.

Because more power is required in order to open a roll-up door than is required in order to close a roll-up door, the power source used for this type of roll-up door is generally the type of power source used for opening and closing garage doors. These mechanisms include a motor which is suspended below the roof of the container space ahead of the position in which the upper edge of the door will be located when the door is in the fully open position. A ram or chain driven mechanism is provided which connects the power source to the upper edge of the door so that when the door is to be opened, the ram is activated to pull the door along the guide track by applying the pulling force to the uppermost door panel. This type of powered mechanism is effective when used for the purposes of closing the door, however, difficulty is frequently experienced in attempting to open a door because the forces applied during opening are also applied directly to the upper door panel.

The manner in which a conventional door opening mechanism is mounted below the roof of a container body has a number of distinct disadvantages. Firstly, it occupies space which might otherwise be used for the purposes of carrying a payload and it therefore reduces the carrying capacity of the vehicle. In addition, because it is exposed on the underside of the ceiling, it is easily damaged by vehicles such as forklift trucks and the like which are driven into and out of container bodies during loading and unloading.

We have found that the difficulties of the prior art described above can be overcome by providing in a container body a winch mechanism which is located in the header cavity and which includes separate winding means for raising and lowering the door. The winding means used for raising the door is connected to the lower end of the door and the winding means used for lowering the door is connected to the upper end of the door so that the door can be raised or lowered.

A further difficulty which has been experienced in the design of articulated doors is that of ensuring that the panel which is the last panel to be positioned in a closing position is fully located in the same plane as the preceding panels so as to present a flat closed door. The guide track which guides the door panels usually includes a curved portion located closely adjacent the upper end of the door opening. In order to ensure that the upper most panel is located in the required closed position, it is customary to use offset support brackets for supporting the guide rollers of the last door panel so that the last door panel will assume the planar closed position even when its associated guide roller is positioned on the curved portion of the guide track. It is preferable to locate said guide roller in the curved portion of the guide track as this facilitates the initial movement of its associated door panel during the early stages of the opening of the door. This "offset" is, however, a permanent offset and as a consequence, it is necessary to provide a substantial clearance between the guide track and the adjacent wall of the storage space so that the door panel which is mounted on the offset guide roller can clear the adjacent wall. This again results in a loss of useful payload space in vans and the like.

We have found that it is possible to locate the last door panel in the required plane while maintaining its associated roller on a curved portion of the guide track without requiring a permanent offset by mounting the roller on a hinged support bracket. By using a hinged support bracket, it is possible to obtain the required planar closure while maintaining the roller associated with the last door panel on the curved portion of the guide track without requiring to provide a special clearance to accommodate the last door panel.

A further difficulty which has been experienced in roll-up doors of vans and the like is that it has been customary to use large metal hinges to connect the door panels. These hinges are unsightly and frequently become corroded. Even if these hinges are located with their hinge pins on the inside of the door, they are customarily attached to the door by bolts which extend through the door panels. These bolts tend to rust and again provide an unsightly appearance and in time will weaken.

We have found that it is possible to provide a hinge for connecting adjacent rollers which includes first and second hinge members each of which have a U-shaped channel for receiving adjacent edges of a door and each of which has hinge tubes which can be aligned one with the other and secured by means of a hinge pin.

Difficulty has also been experienced in attempting to provide an effective seal for sealing the edges of a roll-up door of a van or the like.

We have found that an effective seal can be provided by providing a flexible sealing member which is connected to each jamb and is arranged to bear against adjacent marginal edge portions of the outer face of the door when it is in the closed position.

The controls required for controlling the raising and lowering of a roll-up door or the like are preferably simple and inexpensive. We have found that we can provide a simple push-button control mechanism which is capable of providing an automatic shut-off when the door reaches its limit either fully open or fully closed. The control system also incorporates a security system to prevent unauthorized use.

In addition, we have provided a system which can have controls located in the driver compartment of the vehicle and at a point adjacent the exterior of the door or any other point such as inside the load storage compartment.

SUMMARY OF INVENTION

According to one aspect of the present invention, there is provided in a container body of a van or the like having a loading doorway, a roll-up door and guide tracks which guide the movement of the door, and wherein a header cavity is formed inwardly of the header and outwardly of the arcuate path along which the door travels when moving from its upright closed position to its generally horizontal open position, the improvement of winch means for driving the roll-up door from its closed position to its open position, and from its open position to its closed position, said winch means being located in said header cavity and comprising first and second winding means, a first flexible member having a first end connected to said door at a point located toward the lower end of the door and a second end mounted on said first winding means, a second flexible member having a first end connected to said door at a point located toward the upper end of the door and a second end mounted on said second winding means, and drive means for rotatably driving said first and second winding means in a first direction, to wind in the first flexible member and pay out the second flexible member to drive the door to its open position, and for driving said first and second winding means in a second direction, to wind in the second flexible member and pay out the first flexible member to drive the door to its closed position.

According to a further aspect of the present invention, there is provided in an articulated roller mounted door of the type having a plurality of door panels hingedly connected to one another in an edge-to-edge relationship and in which a guide track is provided for guiding door mounting rollers as the door is moved from its open position to its closed position, the guide track having a first straight length extending in a first plane for locating the door in its open position and a second straight length extending in a second plane for locating the door in its closed position and a curved portion connecting the first length to the second length, the door mounting rollers travelling around the curved section of the guide track during movement of the door between its open and closed positions, and in which the door has a trailing panel which is the last panel to be located in the second plane as the door is closed, and wherein the mounting rollers of the trailing panel which are located on the curved portion of the guide track and are rearwardly off-set to locate the trailing panel in the closed door plane, the improvement wherein the mounting rollers of the trailing panel are pivotally mounted on the trailing panel so as to pivot between a first position in which the mounting rollers are located closely adjacent the trailing panel and a second position in which the mounting rollers are spaced a substantial distance rearwardly of the trailing panel such that when the door is in the open position the mounting rollers will be located in their first position and the trailing door panel will extend closely adjacent the first straight length of the guide track so as to minimize the clearance spaced required between the door and an adjacent wall when the door is in the open position.

According to yet another aspect of the present invention, there is provided a roll-up overhead door comprising a plurality of door panels arranged in an edge-to-edge relationship, each panel having an inner face and an outer face, a hinge for hingedly connecting adjacent side edges of door panels comprising first and second hinge members each having a first body portion which has first and second side walls and a bottom wall which are arranged to define a U-shaped mounting channel, a marginal edge portion of a pair of adjacent door panels being located one in the channel of the first hinge member and one in the channel of the second hinge member, and a plurality of hinge tubes located at spaced intervals along the length of the first body portion and projecting from the inner face of their associated door panels, the hinge tubes of the first hinge member being aligned with the hinge tubes of the second hinge member and hingedly connected to one another by a hinge pin which extends longitudinally therethrough, the bottom walls of the first and second hinge members being disposed opposite, and located in close proximity to one another when adjacent door panels are aligned with one another in a closed position in use such that hinge tubes are not visible when the door is viewed from the outer face.

According to a still further aspect of the present invention, there is provided a hinge for hingedly connecting adjacent side edges of door panels of a roll-up door comprising first and second hinge members each having a first body portion which has first and second side walls and a bottom wall which are arranged to define a U-shaped mounting channel proportioned to receive a marginal edge portion of a door panel, and a plurality of hinge tubes located at spaced intervals along the length of the first body portion and projecting from the first side wall, the hinge tubes of the first hinge member being aligned with the hinge tubes of the second hinge member and hingedly connected to one another by a hinge pin which extends longitudinally therethrough, the bottom walls of the first and second hinge members being disposed opposite and located in close proximity to one another in one position of the hinge to obscure the hinge tubes from view on one side of the hinge.

According to yet another aspect of the present invention, there is provided a control system for controlling the direction in which a reversible D.C. motor is driven to control the opening and closing of an overhead door or the like comprising a first motor driving circuit communicating between a D.C. source and said motor for driving said motor to rotate it in a first direction, first switch means in said first motor driving circuit which when open interrupts the supply of power to said motor and when closed will permit power to be supplied to the motor to drive it in said first direction, a second motor driving circuit communicating between a D.C. source and said motor for driving said motor to rotate it in a second direction, second switch means in said second motor driving circuit which when open interrupts the supply of power to said motor and when closed will permit power to be supplied to the motor to drive it in said second position, a first master control circuit comprising primary and secondary relays, the primary relay being operable to control said first switching means, a first control switch which can be latched in a first position by said secondary relay for grounding said first control circuit, a first power supply line for supply power from a D.C. power source to said primary and secondary relays, a first normally closed limit switch in said first power supply line which is operable to open to interrupt the first power supply line when the door reaches a first limit of its travel, a second master control circuit comprising primary and secondary relays, the primary relay being operable to control said second switching means, a second control switch which can be latched in a first position by said secondary relay for grounding said second control circuit, a second power supply line for supplying power from a D.C. power source to said primary and secondary relays, a second normally closed limit switch in said second power supply line which is operable to open to interrupt the second power supply line when the door reaches a second limit of its travel, first and second grounding lines extending from said first and second control circuits respectively, said first and second control switches each having first, second and base terminals and a switch member for selectively connecting the base terminal to said first or second terminal, the base terminal of the first control switch and the base terminal of the second control switch being connected to one another, the first terminal of the first control switch being connected to said first grounding line, the second terminal of the first control switch being connected to the secondary relay of the first control circuit, the first terminal of the second control switch being connected to said second grounding line, the second terminal of the second control switch being connected to the secondary relay of the second control circuit, said switching member being normally located in contact with its associated first terminal and being latched in contact with its associated second terminal when their associated relay is activated in use, a first slave control circuit comprising; a tertiary relay connected in parallel with the primary relay and secondary relays of the first control circuit through first slave lines, a first slave switch which can be latched in a first position by said tertiary relay, said first slave switch having first, second and base terminals and a switch member for selectively connecting the base terminal to said first or second terminal, said first terminal being connected to the tertiary relay, a second slave control circuit comprising; a tertiary relay connected in parallel with the primary relay and secondary relays of the second control circuit through second slave lines, a second slave switch which can be latched in a first position by said tertiary relay, said second slave switch having first, second and base terminals, and a switch member for selectively connecting the base terminal to said first or second terminal, the first terminal being connected to the tertiary relay, the base terminal of the first slave switch being connected to the base terminal of the second slave switch, the first terminals of the first and second control switches also being connected to the base terminals of the first and second slave switches and to one of said first or second slave lines, a slave control switch which, when in its first position serves to disconnect the control and slave circuits and when in its second position, serves to connect the control and slave circuits, the control system being operable to drive the motor in one direction by means of the master control circuits, alone when the slave control switch is in its first position and by means of the master control circuits and the slave control circuits when the slave control switch is in its second position.

According to a further aspect of the present invention there is provided a latch for powered door assemblies of the type having a winch for winding in and paying out a flexible door pulling member comprising latch socket means having a latch socket formed therein, latch retaining means in said latch socket, latch plug means adapted to mate with said latch socket, catch means mounted on said latch plug and adapted to be connected to with said flexible door pulling member so as to be operable in response to winding in of said door pulling member to move to an extended position in which, when the latch plug is seated in the latch socket, it will interlock with the latch retaining means to lock the latch plug in said latch socket, and which is operable in response to paying out of the door pulling member to release the catch means from the latch retaining means to permit removal of the latch plug from the latch socket.

The invention will be more clearly understood with reference to the following detailed specification read in conjunction with the drawings wherein;

FIG. 1 is a pictorial view illustrating a roll-up door in a partially opened position, FIG. 2 is a partially sectioned enlarged detail view of a portion of the door of FIG. 1, FIG. 3 is a pictorial view of the drive mechanism of FIG. 1, FIG. 4 is a sectional view taken along the line 4—4 of FIG. 1, FIG. 5 is a sectional view taken along the line 5—5 of FIG. 1, FIG. 6 is a sectional view of the clutch mechanism associated with the door closing mechanism.

FIG. 9 is a diagram illustrating a control circuit for use in controlling the opening and closing of the door of FIG. 1, FIG. 11 is a plan view of a latch plug, FIG. 12 is a sectional view taken along the line 12—12 of FIG. 11.

Figure 1:
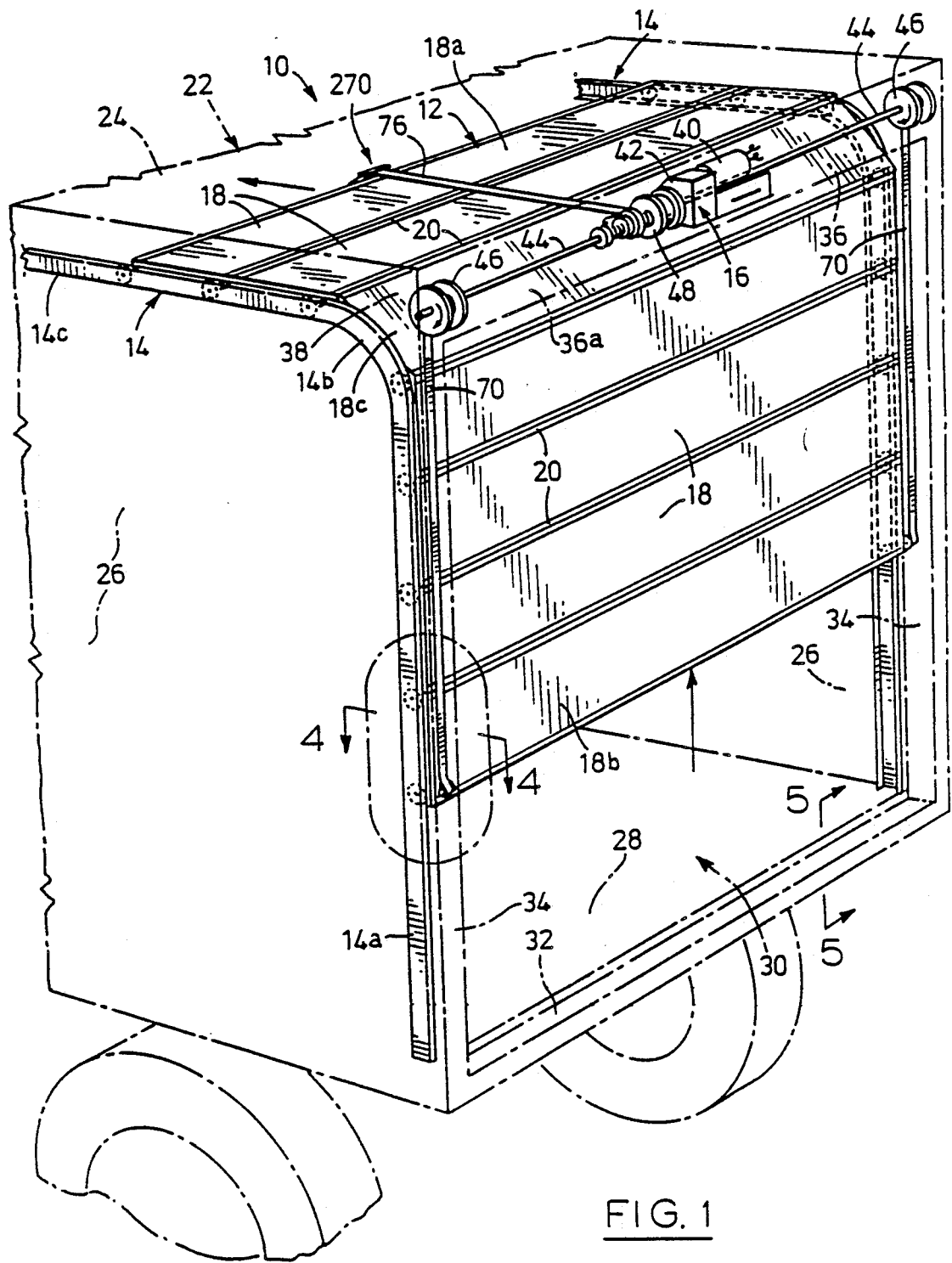

With reference to FIG. 1 of the drawings, the reference numeral 10 refers generally to a door assembly constructed in accordance with an embodiment of the present invention. The door assembly 10 includes a door 12, a pair of guide tracks 14 and a winching mechanism 16. The door 12 consists of a plurality of door panels 18 which are hingedly connected in an edge-to-edge relationship by means of hinges 20. The door panels 18 include an upper door panel 18a and a lower door panel 18b.

The guide tracks 14 each have an upright portion 14a, a curved portion 14b and a generally horizontally extending portion 14c.

A portion of a container body in which the roll-up door of the present invention may be located is generally identified by the reference numeral 22 and is shown in broken lines in FIG. 1 for the purposes of facilitating illustrations of the door mechanism. The container body 22 includes a top wall 24, a pair of side walls 26 and a floor 28. A loading doorway 30 is formed at one end of the container body. The doorway 30 is surrounded by a sill 32, a pair of jam members 34 and a header 36.

A header cavity 38 is formed inwardly of the header 36. The header cavity 38 is bounded by the outer wall 36a of the header 36, the adjacent portion of the top wall 24 and the path of travel of a door panel 18 as it is driven around the curved portion 14b of the guide track. It will be apparent that when the door is in the opened position in which the lower most panel 18b will assume the position in which the panel 18c is illustrated in FIG. 1, the winch mechanism 16 will not be exposed to or visible from within the storage chamber of the container body. It follows that this mechanism will be protected by the door against coming in contact with the payload or vehicles used for moving the payload into or out of the container body.

WINCH MECHANISM

Figure 3:
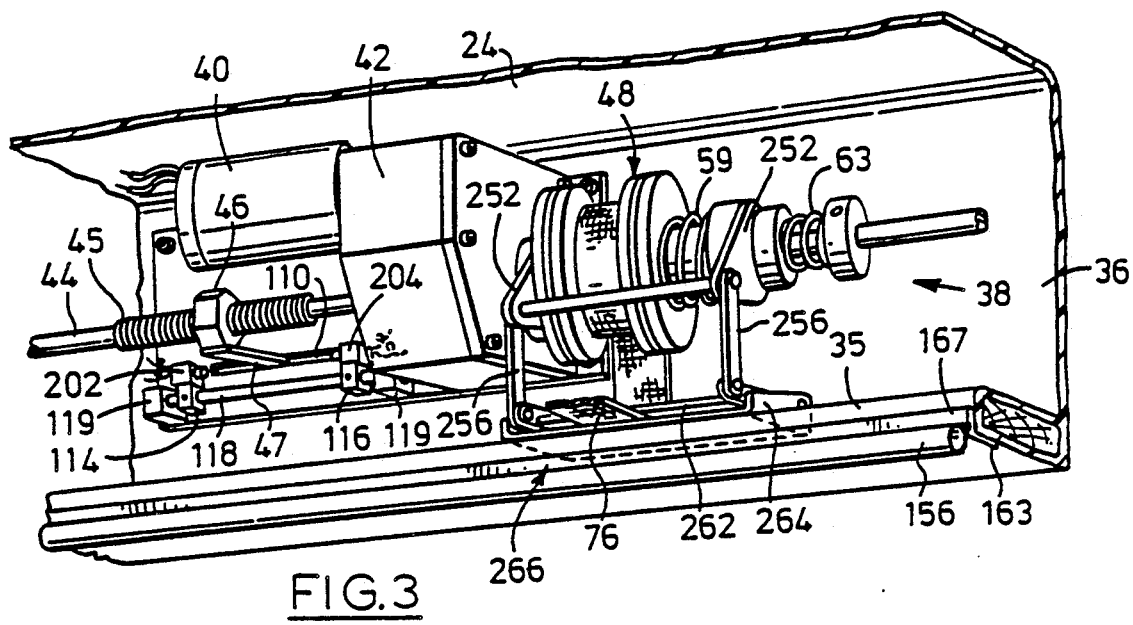

The winch mechanism 16 will now be described with reference to FIGS. 1, 3, 4 and 6 of the drawings. As shown in FIG. 3 of the drawings, the winch mechanism 16 includes a reversible D.C. motor 40 which is drivingly connected to a primary drive shaft 44 through a reduction gearbox 42. A first pair of winding spools 46 are secured to opposite ends of the shaft 44 and are secured thereto so as to be rotatably driven in either direction in response to rotation of the shaft 44. A second spool 48 is connected to the shaft 44 through a clutch mechanism generally identified by the reference numeral 46. The clutch mechanism 46 is designed to permit the spool 48 to slip as required in use to accommodate the differences between the rate of winding in on the spools 46 as compared to the rate of paying out on the spool 48.

Figure 6:
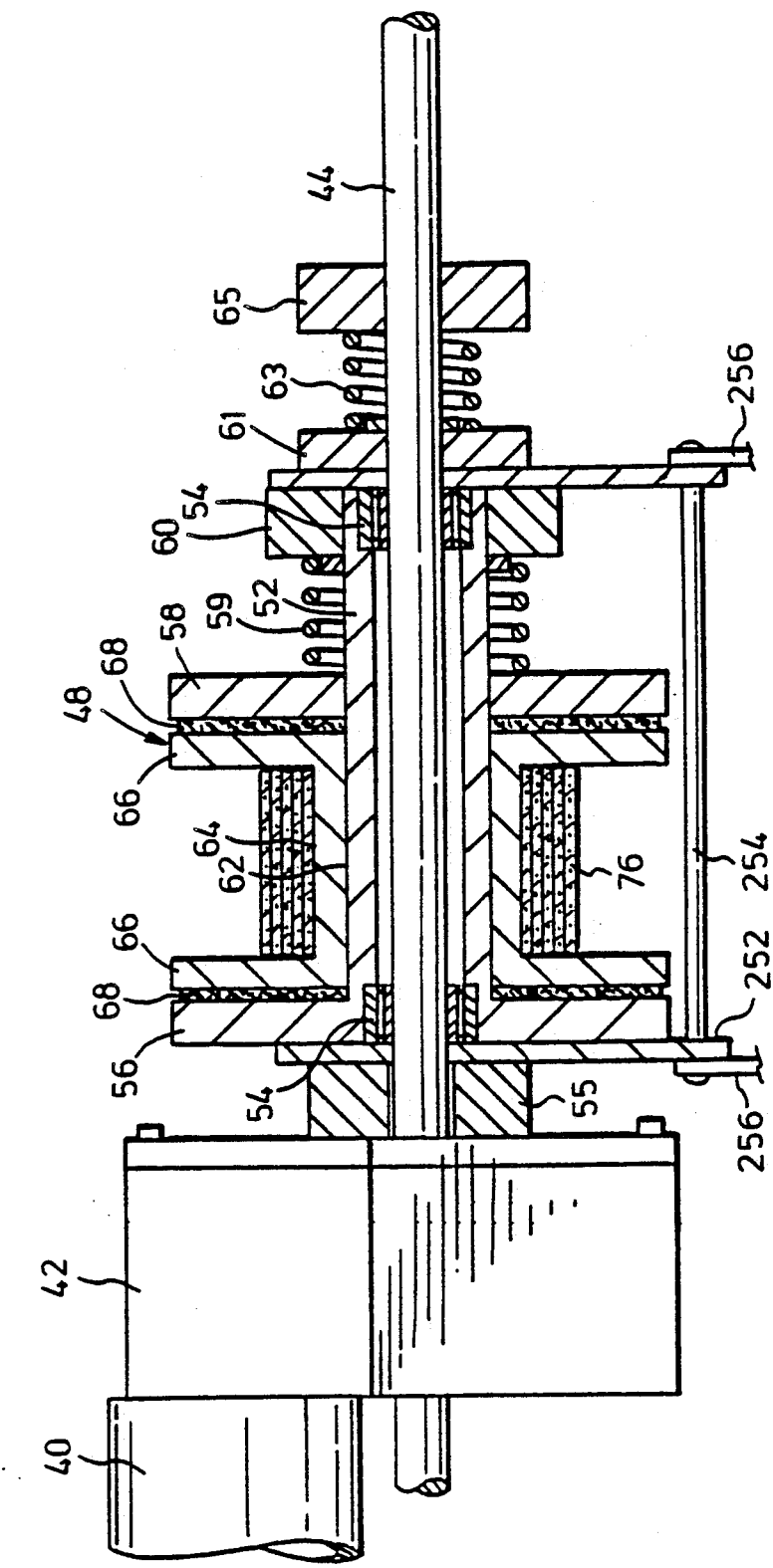

As shown in FIG. 6 of the drawings, the clutch mechanism 50 includes a sleeve 52 which is mounted on one-way clutch collars 54. The sleeve 52 is formed with an annular flange 56 at one end thereof. A disc 58 is slidably mounted on the sleeve 52 for movement toward and away from the flange 56. A compression spring 59 bears against the disc 58 and against a collar 60 which is fixed with respect to the sleeve 52. The spool 48 is formed with a bore 62 which will receive the sleeve 52 in a close fitting sliding relationship so that the sleeve 48 can rotate on the sleeve 52. The spool 48 has a winding drum portion 64 and a pair of oppositely disposed side flanges 66. Annular clutch plates 68 which are made from a bearing material such as bronze or the like are located between the side flanges 66 and the annular flange 56 and the disc 58 and serve to permit the spools 48 to slip with respect to the sleeve 52 and thus the shaft 44 so as to accommodate variations in the rate of payout and wind-in required to be consistent with that of the fixed first spools 46.

Figure 4:
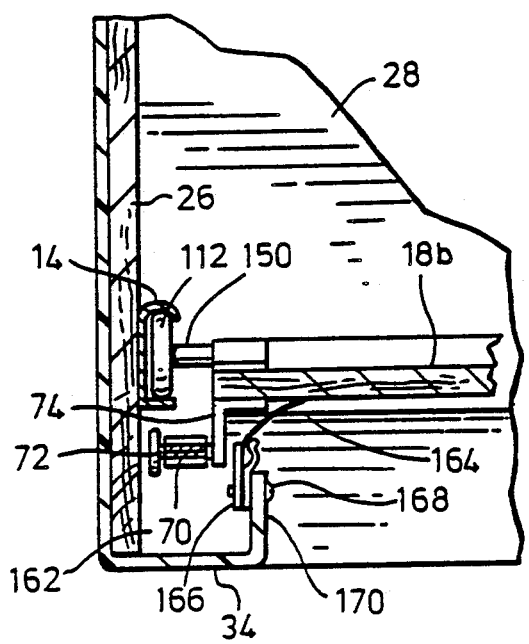
Figure 5:
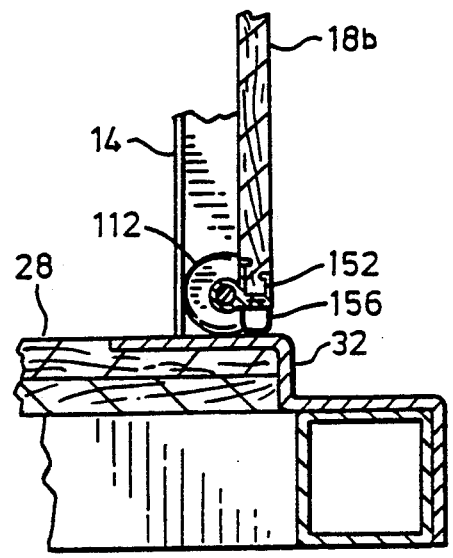

The first spools 46 are connected by means of a first flexible strap member 70 to a pin 72 which is mounted on an angle bracket 74 which is located adjacent the lower edge of the lower most door panel 18b (FIG. 4). The other end of the strap 70 is anchored with respect to the drum portion of the spool 46. The strap 70 is proportioned to be of a width which is only slightly less than the width of the drum portion of the spool 46 so that successive turns of the strap 70 will wound upon one another on the winding drum of the first spool 70 when the first spool 46 is wound in the direction to cause winding in of the strap 70.

The second flexible strap member 76 has one end secured to the upper edge of the upper most door panel 18a by means of a mounting assembly 80 (FIG. 2), the other end of the strap member 76 is secured to the winding drum portion 64 of the first spool 46. The winding drum portion 64 is proportioned to ensure that successive turns of the strap member 76 will be wound upon one another when the strap 74 is wound onto the spool 48.

It will be apparent that the rate at which the straps 70 and 76 are wound in or paid out from their respective spools will vary as the effective diameter of the winding surface changes because of the thicknesses of the web located on the spool at any particular time. As previously indicated, the first spools 46 are secured with respect to the shaft 46 and consequently these variations in the relative wind in and payout speed are accommodated by the fact that the second spool 48 can slip with respect to the primary drive shaft 44. The one-way clutch mechanisms 54 ensure that the sleeve 56 is free to rotate with respect to the primary shaft 44 when the primary shaft is being driven in the direction which will cause the first spools 46 to wind in the straps 70 so that the strap 74 will unwind freely from the spool 76 which will offer very little resistance to unwinding and therefore will not significantly resist the opening of the door. When the door is to be closed, the motor 40 will be driven in the opposite direction and the one-way clutch mechanisms 54 will ensure that the drive shaft 44 is positively keyed to the sleeve 56. When, however, the rate at which the second straps 76 is wound in is greater than the payout speed of the straps 70, the drag caused by the lower payout speed of the straps 70 will cause the second spool 48 to slip with respect to the drive shaft 44 so that the rate at which the strap 74 is wound in is equal to the rate at which the strap 70 is paid out.

It will be noted that the diameter of the coiled strap 70 which is located on the spools 46 will be at a minimum when the straps 70 are fully paid out and the door is in the closed position. It follows that the winding in torque will be at a maximum under these same conditions. This is extremely desirable because the maximum load conditions also exist when the door is at its lower most position.

The power supply to the motor 40 is controlled so that it will be cut off when the door reaches its fully open position or its fully closed position. The power supply cut-off mechanism is illustrated in FIG. 3 of the drawings wherein it will be seen that limit switches 202 and 204 are located at opposite ends of a slot 110 which is formed in the base plate 112 which is mounted on the header 36. The primary drive shaft 44 has a threaded portion 45 on which a nut 46 is threadedly mounted. An arm 47 extends from the nut 46 into the slot 110. The arm 47 serves to prevent rotation of the nut 46 while permitting longitudinal movement of the nut 46 along the shaft 44 as it is rotatably driven. Rotation of the shaft 44 in one direction will cause the nut 46 to move toward one or other of the limit switches 202 and 204 and will open the limit switches 202 or 204 when the shaft 44 has rotated to a sufficient extent to fully open or fully close the door in use. The limit switches 202 and 204 are mounted on support blocks 114 and 116 which are mounted on the shaft 118 so as to be positioned at any point along the length thereof. The shaft 118 is supported by posts 119 which extend from the base plate 112. Thus it will be seen that the extent to which the door can open or close can be adjusted by adjusting the position of the limit switches 202 and 204.

UPPER DOOR PANEL BIASING MECHANISM

Figure 2:
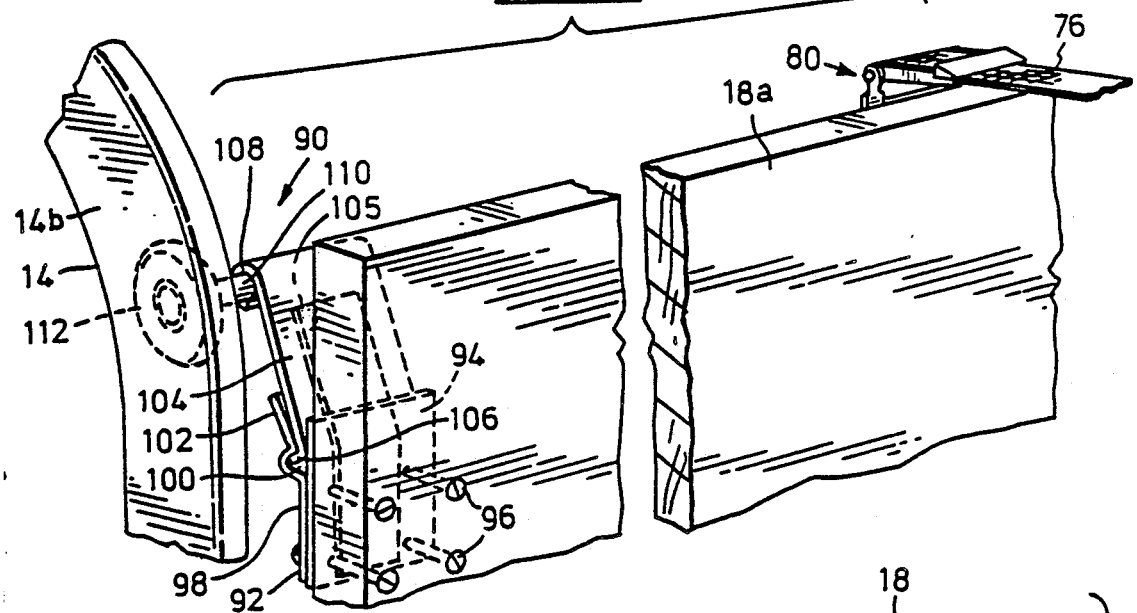
Figure 2A:
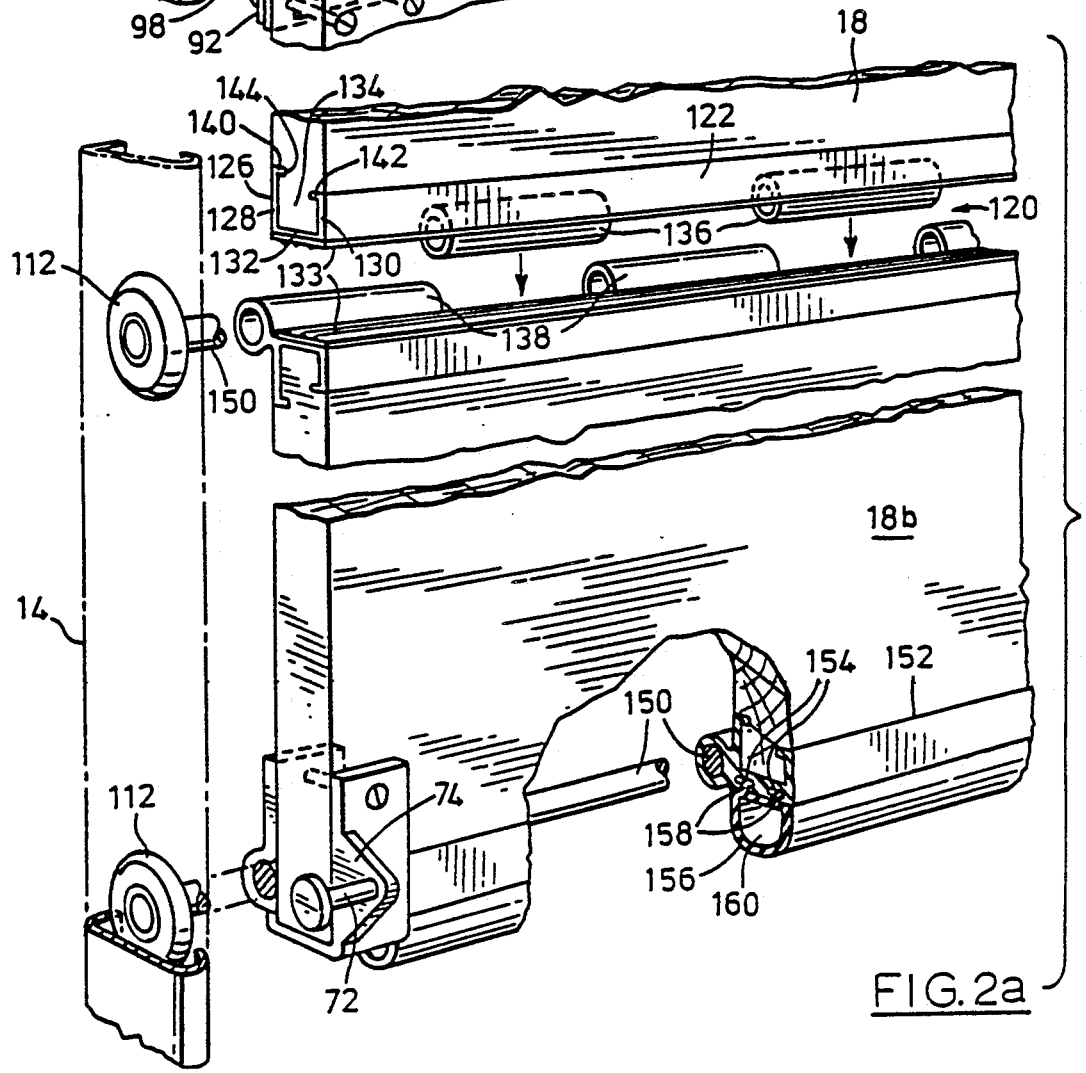

As shown in FIG. 2 of the drawings, a biasing mechanism 90 is provided for the purposes of "kicking" the upper edge portion 18d of the upper or trailing door panel 18a. The kicker 90 includes a mounting bracket 92 which consists of a base plate 94 which is secured to the upper door panel 18a by means of mounting screws 96. A first hinge plate 98 is secured in a face-to-face relationship to the bace plate 94 by means of the mounting screws 96 and is formed with a hinge channel 100 and a lip portion 102. A second hinge plate 104 is formed with a hinge flange 106 at one end thereof and an eye 108 at the other end thereof. The hinge flange 106 is seated in the channel 100 so that the second hinge plate 104 is free to pivot relative to the door panel 18a between a position in which it is arranged in a face-to-face relationship with respect to the lip portion 102 and a position in which it is arranged in a face-to-face relationship with respect to the door panel 18a. A spring 105 has one end clamped between the hinge plate 98 and the base plate 94 and its other end bears against the second hinge plate 104. The spring 105 serves to urge the hinge plate 104 toward the door panel 18a. A stub shaft 110 of a roller 112 is mounted in the eye 108. The roller 112 is mounted for movement in the guide track 14.

The second hinge plate 104 is proportioned to ensure that the upper or trailing panel 14a can be located in an upright position even when the roller 112 is positioned on the curved portion 14b of the guide track 14. It is not necessary to provide any biasing springs urging the trail panel to the upright position because the trailing panel 14a will be maintained in the upright position by the forces applied to it by the second flexible strap member 76. The latching mechanism 80 will also serve to maintain the panel 18a in the upright position.

LATCH MECHANISM

Figure 7:
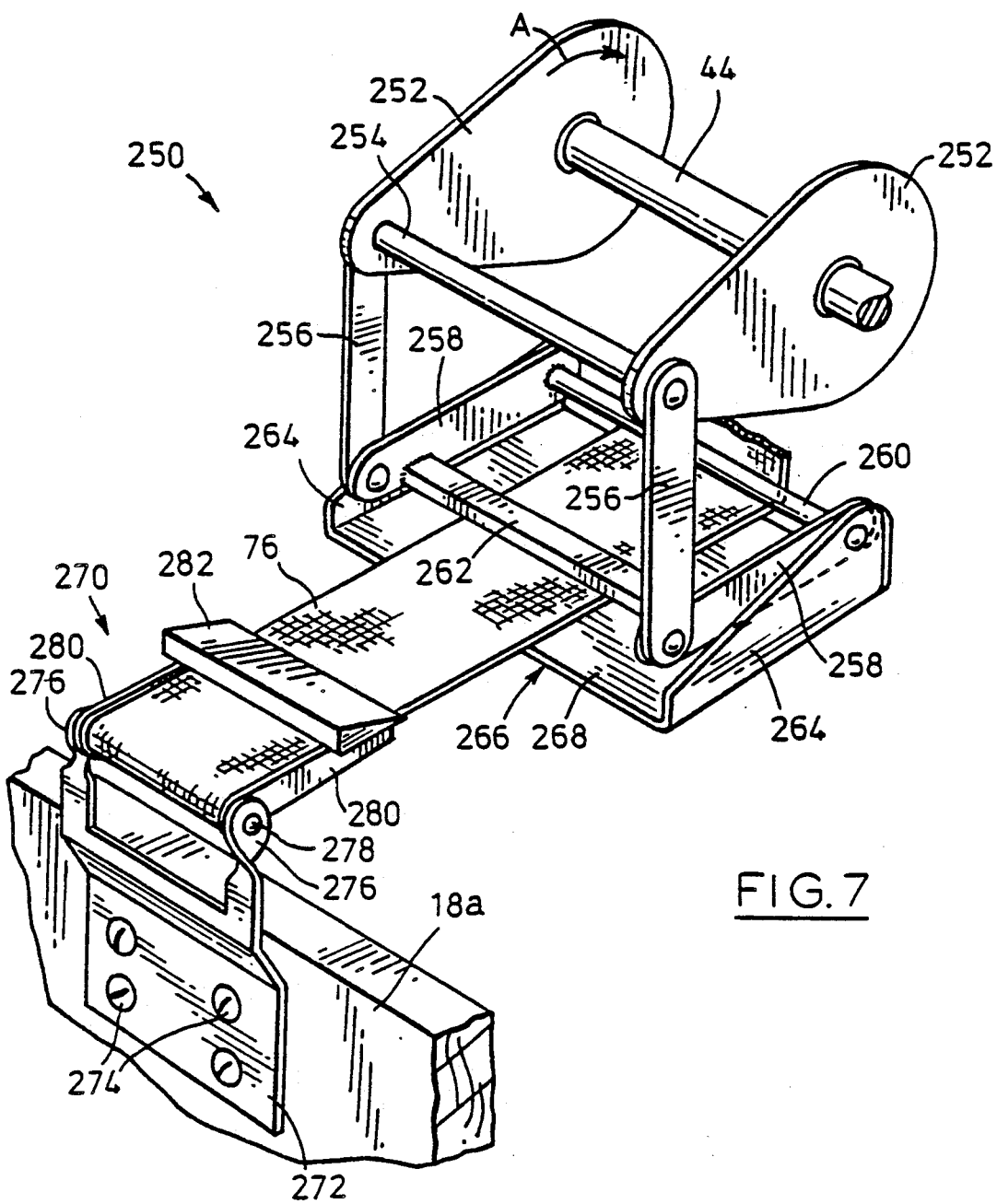
FIG. 7 is a pictorial view of the latching mechanism which holds the door closed.

A latch mechanism is generally identified by the reference numeral 250 in FIG. 7 of the drawings. The latch mechanism includes a pair of arms 252 which are mounted on the shaft 44. As shown in FIG. 6 of the drawings, one of the arms 252 is located between the annular flange 56 and a collar 55. A friction fit is established between the arm 252 and the collar 55 and flange 56 by the pressure applied through the spring 59. Similarly, the other arm 252 is retained between the collar 60 and the collar 61. The compression spring 63 bears against the collar 61 and a further collar 65 which is secured to the shaft 44. The collar 61 is therefore pressed against the arm 252 by the spring 63. As a result, the arms 252 will tend to rotate about the axis of the shaft 44. The arms 252 are not, however, drivingly connected to the shaft 44 with the result that when the extent of movement of the arms 252 is restricted, the arms will remain stationary while the shaft 44 is rotatably driven. A shaft 254 extends between the adjacent arms 252 and serves to connect the distal ends of the arms 252. A link arm 256 extends downwardly from each arm 252. The link arms 256 are connected to the distal ends of the lever arms 258. The proximal ends of the lever arms 258 are pivotally mounted on a shaft 260. A locking bar 262 extends transversely between the distal ends of the lever arms 258. The shaft 260 is mounted in the oppositely disposed side walls 264 of a support bracket which is generally identified by the reference numeral 266. The bracket 266 includes a base plate 268 which in use is mounted on the sill 35 (of the header 36) (FIG. 3).

A latch plate assembly 270 is mounted on the door panel 18a. The latch plate assembly 270 includes a mounting bracket 272 which is secured to the door panel 18a by means of mounting bolts 274. The mounting bracket 272 has a pair of lugs 276 which project from the upper end thereof. A shaft 278 is mounted in and extends transversely between the lugs 278. A pair of arms 280 have their proximal ends pivotally mounted on the shaft 278. A wedge-shaped locking bar 282 is mounted at and extends transversely of the distal ends of the arms 280. The second flexible strap member 76 has one end looped around the shaft 278 and extends below the locking bar 282. The second flexible strap 76 also extends below the locking bar 262 and around the shaft 260.

Figure 8:
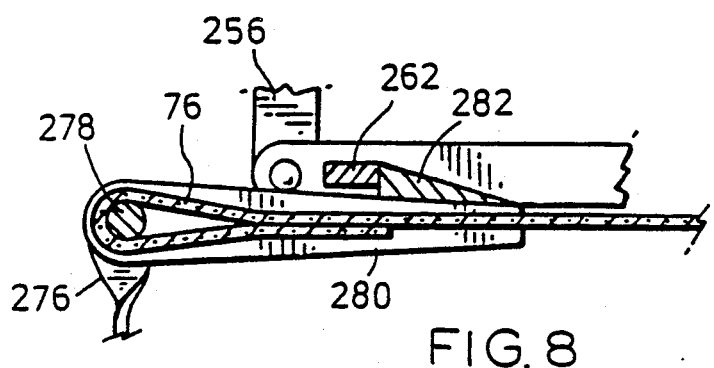
FIG. 8 is a sectional side view of a portion of the latching mechanism in a closed position.

In use, the winding in of the belt 76 causes the locking bar 282 to pass under the locking bar 262 to assume the position shown in FIG. 8 of the drawings. When in this position, the drive motor can be deactivated and the door will be retained in the locked position by the fact that the locking bar 282 cannot pass under the locking bar 262.

When the drive motor is activated for rotation in the direction required to open the door, the rotation of the shaft 44 in the direction of the arrow A will cause the arms 252 to rotate in the same direction. This in turn will raise the locking bar 262 above the locking bar 282 thereby releasing the locking bar 282 to permit the second flexible belt 76 to pay out.

It will be noted that as the belt 76 is being wound in, the shaft 44 will be driven in a direction opposite to the direction indicated by the Arrow A and consequently, the locking bar 262 will normally by urged downwardly toward the belt 76. The wedge-shaped configuration of the locking bar 282 will, however, permit this bar to pass under the locking bar 262 and the load which urges the bar 262 downwardly will cause the bar 262 to be lowered after the bar 282 passes inwardly therefrom to assume the position shown in FIG. 8.

HINGE MECHANISM

The hinge mechanism used for connecting adjacent side edges of the door panels will now be described with reference to FIG. 2 of the drawings. As shown in FIG. 2 of the drawings, the hinge mechanism which is generally identified by the reference numeral 120 includes a first hinge member 122 and a second hinge member 124. Each hinge member 122,124 is formed from an extruded length of material such as a plastics material and includes a body portion 126 which has first and second side walls 128 and 130 and a bottom wall 132 which cooperate to form a generally U-shaped channel 134. A plurality of hinge tubes 136 are located at spaced intervals along the length of the first hinge member 122 and a plurality of similar hinge tubes 138 are located at spaced intervals along the second hinge member 134. The first and second side walls 128 and 130 have short flanges 140 and 142 extending inwardly from the outer ends thereof. The side walls 128 are proportioned so as to be longer than the side walls 130 so that the flanges 140 and 142 are not located directly opposite one another. Channels 144 and channels 146 are formed in the marginal edge portion of the door panels 18. By offsetting the channels 142 and 144, the cross-section of the partial edge portion is not weakened to the extent that it would be if the channels 42 and 44 were disposed directly opposite one another. A layer 133 of a flexible plastics is extruded simultaneously with the bottom wall 132 such that when the bottom walls 132 are arranged in a face-to-face relationship when their associated wall panels are aligned in the closed position of the door, the flexible layers 133 will be compressed against one another to form a seal extending across the full width of the door.

A pivot pin 150 is extended longitudinally through the hinge tubes 136 and 138 so as to pivotally connect the adjacent door panels. As shown in FIG. 1 of the drawings, when the door is in the closed position, the hinge tubes are not visible at the exterior surface of the door.

Rollers 112 are located on the ends of each of the pivot pins 150 and are arranged to run in the guide tracks 14.

In order to seal the lower edge of the door against the sill 32 when the door is in the closed position, a lower sealing member 152 is provided. The sealing member 152 is formed with substantially the same structure as the first hinge member 122 with the exception that two T-shaped slots 154 are formed in the lower face of the bottom wall. A tubular extrusion 156 is formed with T-shaped ribs 158 which extend longitudinally thereof and are proportioned to fit within the T-shaped slots 154. The tubular extrusion 156 has a chamber 160 located therein which permits compression of the tubular extrusion 156. The tubular extrusion 156 is preferably made from a flexible plastics material. A similar tubular extrusion 156 is provided on the header 36 (FIG. 3) to provide a seal between the door panel 18a and the sill rail 35 of the header 36. An L-shaped extrusion 163 is mounted on the sill rail 35. The upright arm 167 of the L-shaped extrusion is formed with a pair of T-shaped slots (not shown) to receive the T-shaped mounting ribs of the tubular extrusion 156.

As shown in FIG. 4 of the drawings, each of the jam members 34 is formed with a U-shaped channel 162 which extends longitudinally thereof. A flexible sealing web 164 has one edge secured within the channel 162 by means of a mounting clip 166 which is secured by mounting screws 168 to the side wall 170 of the jam member 34. The flexible sealing web 164 has a sufficient length to extend into contact with the outer surface of the marginal edge portions of the adjacent door panels. The sealing webs 164 extend over the full height of the jam members 34 and serves to seal the side edges of the door along the full length of the door when it is in the closed position.

METHOD OF OPENING AND CLOSING DOOR

When the door is in the closed position, it can be opened by activating a control system which is described hereinafter which serves to power the drive motor 40 so that it will rotate in a first direction which will cause rotation of the primary drive shaft 44 in the direction required to wind in the first flexible strap members 70. This will cause the door to move toward the open position. Because the straps 70 are connected to the lower most door panel 18b, the only load which is applied to the door panels which are located above the lower most panel 18b are loads which push the preceding panels along the guide tracks. These pushing forces permit the preceding door panels 18 to articulate freely along the track and this facilitates the manipulation around the curved portion of the track.

As previously indicated, the second spool 48 can slip to permit the payout rate of the second flexible member 76 to match the wind-in rate of the first flexible member 70.

When the door is fully opened, the trailing or lower door panel 18b will obscure the winching mechanism 16 and protect it from damage during loading and unloading of the container compartment.

In order to close the door, the control system is operated to drive the motor 40 in the opposite direction thereby causing the second spool 48 to wind in the strap 76 so that the door is pulled to the closed position by a load applied to the upper door panel 18a. The rotation of the motor 40 in the opposite direction drives the first spools 46 in the direction required to payout the straps 70. Again by effectively pushing the door to the closed position by applying a load to the trailing door panel, the door panels will articulate freely when being driven around the curved portion of the track and therefore negotiate the curved portion of the track without difficulty. As previously indicated, the variation in wind-in and payout speeds of the straps 76 and 70 is accommodated by the slipping clutch mechanism.

From the foregoing it will be apparent that the door of the present invention can be powered from the open position to the closed position and from the closed position to the open position as required in use.

ELECTRICAL CONTROLS

A control system suitable for use in controlling the opening and closing of the doors illustrated in FIG. 9 of the drawings and is generally identified by the reference numeral 180. The control system is designed to control the direction of rotation of the reversible D.C. motor 40.

The control system 180 includes a first motor driving circuit 182 and a second motor driving circuit 184 which serve to supply power to the motor 40 from a D.C. source through a line 186 and branch lines 186a and 186b. A first pair of switches 188 and a second pair of switches 190 are located in the first motor driving circuit 182 and in the second motor driving circuit 184 respectively.

A first control circuit which is generally identified by the reference numeral 196 is provided for controlling the movement of the first pair of switches 188 of the first motor driving circuit 182 and a second control circuit is provided for the purposes of controlling the movement of the second pair of switches 190 which are located in the second motor driving circuit 184. The first control circuit 196 comprises a primary relay 192a and a secondary relay 192b which are connected in parallel. The primary relay 192a is operable to control the movement of the first pair of switches 188. A first control switch 222 by which is a self-latching switch which is associated with the secondary relay 192b. A first power supply line 200 is connected through a branch 200a to the first control circuit 196 and through a branch 200b to the second control circuit 198. A first normally closed limit switch 202 is provided in the branch line 200a and a second normally closed limit switch 204 is provided in the branch line 200b.

The second control circuit 198 includes a second control switch 224 which is associated with the secondary relay 194 of the second control circuit 198.

The first control switch 222 and second control switch 224 serve as the master control switches which are manually operable to cause rotation of the motor 40 in one direction or the other to raise or lower the door as required in use. The first control switch 224 has a first terminal 230, a second terminal 234 and a base terminal 226. The second control switch 224 has a first terminal 232, a second terminal 236 and a base terminal 228. The base terminals 226 and 228 are connected to one another by a grounding line 220. The first terminals 230 and 232 of the first switch 222 and second switch 224 are connected to one another by the grounding line 216.

A slave control system is provided which is generally identified by the reference numeral 380. The slave control system 380 includes a first slave control switch 322 and a second slave control switch 324. The first slave control switch 322 has a first terminal 330, a second terminal 334 and a base terminal 326. The second slave control switch 324 has a first terminal 332, a second terminal 336 and a base terminal 328. A first slave relay 392 is connected in parallel with the relays 192a and 192b through lines 331 and 333. A second slave relay 394 is connected in parallel with the relays 194a and 194b through lines 335 and 337. An on/off push-button switch generally identified by the reference numeral 339 has switch members 341 in each of the lines 331, 333, 335 and 337. The on/off push-button switch 339 is operable to activate or deactivate the slave control system as required in use. A line 334 connects the grounding line 216 of the master control system to the line 331 of the slave control. An LED 345 is provided in the line 343 to provide a visual indication that the slave control circuit is armed when the push button switch 339 is in the position required to arm the slave control circuit. A grounding line 347 is connected to the terminals 330 and 332 of the slave control switches 322 and 324.

A control switch 185 is provided in the power supply line 186 for interrupting the supply of power from the 12-volt power supply system of the vehicle. A relay 187 is associated with the switch 185. The relay 187 is connected through a line 189 to the ignition control switch which is generally the key-operated ignition switch of the vehicle so that power can only be supplied to the system when the ignition switch is operated.

In use, the when the door is in its fully closed position, the limit switch 202 will be closed and the limit switch 204 will be open. When the system is activated through the ignition control switch, power is supplied from the 12-volt power supply through the switch 185 and line 186 to arm the first and second motor driving circuits. Power is also supplied through the line 200, switch 202 and line 200a to arm the first control circuit 196. When the door is to be raised, the first control switch 22 is manually activated to move its switch member from the position shown in solid lines in FIG. 1 to the position contacting the second terminal 234. When in this position, the secondary relay 192 is operable to latch the switch member of the switch 222 in its operable position grounding the first control circuit. The first control circuit 196 is grounded through the switch 222, switch 224, lines 216, 343 and slave switches 322 and 324 to ground line 347. When the first control circuit 196 is activated, the primary relay 192 is operable to cause the first motor switches 188 to move from the open position shown in solid lines in FIG. 9 to a closed position completing the first motor driving circuit 182. The motor 40 will continue to rotate in the direction required to open the door until either the second master control switch 224 is manually operated to break the connection between the base terminal 228 and the first terminal 232 to interrupt the grounding circuit or until the limit switch 202 is opened by reason of the door reaching the upper limit of its travel as previously described.

The second control circuit 198 operates to raise the door in response to manual operation of the switch 224 in the same manner as that previously described and will not therefore be described in detail.

When the on/off push-button 393 is operated to arm the slave control circuit 380, it is possible to drive the motor 40 in the first direction by operating either the master control switch 222 or the slave control switch 322 and it is possible to drive the motor 40 in the opposite direction by operating the master control switch 224 or the slave control switch 324. In order to activate the motor 40 to open the door by using the slave control system, the slave control switch 322 is manually displaced from the position shown in solid lines in FIG. 9 to make contact with the terminal 334. This permits the first control circuit 196 to be grounded through the line 333, terminal 334, terminal 326, terminal 328, terminal 332 and ground line 347. Simultaneously, the relay 392 is activated to latch the switch 322 in its operable position in contact with the terminal 334. Again, the motor 40 will be driven in the required direction until either the limit switch 202 is opened or the slave control switch 324 is operated. The slave control switch 324 is similarly operable to cause the motor 40 to be driven in the direction required to close the door and its operation can be interrupted by operating the slave control switch or the opening of the limit switch 204.

It will be apparent that when the slave control switch 339 is in the position required to activate the control switch, it is possible to initiate rotation of the motor 40 in one direction by operating one of the control switches of the master control and to interrupt the movement of the motor and/or cause rotation in the opposite direction by activating the appropriate slave control switch.

It will also be apparent that when both master control switches 222 and 224 are manually depressed simultaneously or both slave control switches 322 and 324 are depressed simultaneously, the power supply to the motor 40 can be interrupted at any time during the raising or lowering of the door. This gives the operator the opportunity to stop the movement of the door or reverse the direction of movement of the door at any time if this is required for safety purposes.

In use, the master control switches may be located in the driver compartment and the slave control switches may be located at a point adjacent the door. Consequently, if the vehicle is to be used for delivering small loads such as parcels, it is possible for the driver to activate the master control switch to cause the door to begin to open before he leaves the driver compartment. As a result, when he arrives at the rear end of the vehicle, the door will be at least partially open. He can then remove the parcel which is to be delivered and immediately thereafter activate the slave control switch to cause the door to move towards its closed position.

Figure 10:
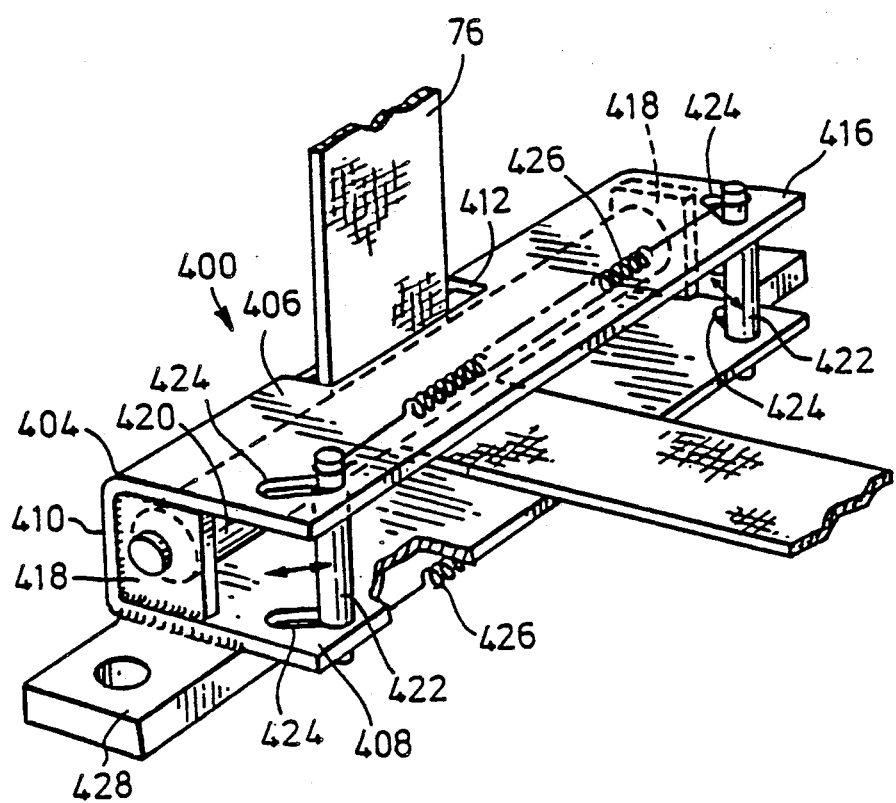
FIG. 10 is a pictorial view of a latch socket constructed in accordance with an embodiment of the present invention.

Various modifications of the present invention will be apparent to those skilled in the art. One such modification is illustrated in FIGS. 10, 11 and 12 wherein the reference numeral 400 refers generally to a latch socket housing and the reference numeral 402 refers generally to a latch plug. The latch socket housing 400 comprises a U-shaped housing 404 which has a top wall 406, a bottom wall 408 and a back wall 410. A notch 412 is formed in the top wall 406 centrally of the width thereof. The top, bottom and back walls cooperate with one another to form a U-shaped socket 414 therebetween. The top wall 412 has a flange portion 416 which extends upwardly and forwardly therefrom which serves to guide the latch plug 403 into the notch 414 in use. A pair of end plates 418 are mounted in the socket 414 at opposite sides thereof and are secured to the top, bottom and side walls. A guide roller 420 is mounted for rotation in the end plates 418. The guide roller 420 serves to guide the flexible strap member 76 into the socket 414 through the open end thereof and out of the socket through the notch 412. A pair of pins 422 have their opposite ends mounted in elongated slots 424 formed in the top and bottom walls 406 and 408 respectively. The slots 424 which are formed in each wall are arranged to converge with one another in a direction toward the entranceway to the socket 414. Tension springs 426 are connected to and extend between the pins 422 and are pretensioned to apply a load to the pins 422 which urges them to their forward position shown in FIG. 10. A mounting bracket 428 is secured to the bottom wall 408 and serves to mount the socket housing 400 in the position assumed by the support bracket 266 of the latch mechanism illustrated in FIG. 3 which, as previously indicated, is located in the header cavity 38.

The latch plug 402 comprises a pair of lugs 430 which are mounted on the upper edge of a door panel 18a. A bar 432 has its opposite ends pivotally mounted in the lugs 430. A pair of face plates 434 and 436 have their proximal ends mounted on the bar 432 and extend forwardly therefrom in a spaced parallel relationship to provide a compartment 438 therebetween. A pair of spacer pins 440 are located at the distal ends of the face plates 434 and 436 and extend therebetween. The spacer pins 440 serve to space the distal ends of the face plates 434 and 436 with respect to one another. A pair of latch levers 442 are pivotally mounted in the compartment 438 by means of pivot pins 444. The latch levers 442 each have an outer end portion 446 which projects from the pivot pin 444 toward the distal end of the plug and an inner end 448 which projects toward the proximal end of the plug. The outer end of each lever arm is hook-shaped and has a recess 450 which is shaped in proportioned to interlock with the locking pins 422 when the plug is seated in the socket. A shoulder 452 is formed on the inner face of each lever. A locking bar 454 is slidably mounted in the compartment 438 and extends transversely between the inner side faces of the latch levers 442. The locking bar has a sufficient length to bear against the inner side faces of the latch levers to cause the levers to be pivotted outwardly to the extended position shown in FIG. 11 when the locking bar is located in its forward position. The inner end portions 448 of each lever are arranged to bear against the bar 432 when the latch levers are in the extended position so as to limit the extent to which the outer end portions 446 may project from the side edges of the face plates 434 and 436. It will be noted that the side edges of the plates 434 and 436 converge in a direction toward the distal end thereof so as to be generally wedge-shaped to facilitate the passage of the distal end thereof inwardly between the latch pins 422 as will be described hereinafter. The locking pin 454 is movable between the locking position shown in FIG. 11 in solid lines and a release position in which it is located more closely adjacent the proximal end of the face plates 434 and 436. A tension spring 458 has its opposite ends secured to the outer end portions of the latch levers 442. The tension spring 458 is preloaded so that it will normally serve to urge the latch lever arms toward a retracted position with respect to the compartment 438.

Passageways 456 are formed in the face plates 434 and 436 through which an end of the belt 76 is looped so that the belt 76 will bear against the locking pin 454. It will be noted that when the belt 76 is pulled in the direction of the arrow B, it will bear against the locking pin 454 causing it to move toward the distal end of the plug and this in turn will cause the latch levers to be pivotted to the extended position shown in FIG. 11 in which the recesses 450 are located outwardly from the side edges of the face plate 434, 436. When the pulling force is removed from the belt 76, the tension spring 458 will serve to draw the outer end portions 446 of the latch levers 442 inwardly toward one another to a retracted position. This will have the effect of causing the locking pin 454 to be deflected toward the proximal end of the latch plug.

As previously described, when the door is to be closed, the belt 76 is wound in. This will eventually cause the latch plug to be drawn inwardly with respect to the latch socket housing. It will also apply a tensile load to the belt 76 in the direction of the arrow B and as previously described, this will have the effect of locating the latch lever arms in their extended position illustrated in FIG. 11. As the distal end of the plug begins to enter the socket 414, the outer end portions of the lever arms will bear against the latch pins 422. Because the distance between the outer end portions of the lever arms when in the extended position, is greater than the distance between the latch pins 422 when they are in their innermost position illustrated in FIG. 10, the arms 446 will engage the latch pins 442 and cause them to be deflected rearwardly and outwardly away from one another until they are spaced a sufficient distance to permit the outer end portions of the latch levers to pass therebetween. As soon as the outer end portions of the lever arms are located inwardly of the latch pins 422, the tension spring 426 will serve to draw the pins 442 to their original position. This will locate the pins 422 in the recesses 450. As a result, as long as tension is maintained in the belt 76, the lever arms 446 will be maintained in an interlocking relationship with the locking pins 422 which will serve to prevent opening of the door.

When the tension in the belt 76 is relieved as for example, when a direction of rotation of the drive motor 40 is reversed, the tension spring 456 will serve to draw the outer end portions of the latch lever arms inwardly to their retracted position so as to release the latch pins 422 from the recesses 450 so that when the door opening forces are applied, the latch plug can be freely withdrawn from the latch socket.

From the foregoing, it will be apparent that this latch mechanism provides a simple and effective self-locking latch for a powered door assembly.

We claim:
1. A latch for powered door assemblies of the type having a winch for winding in and paying out a flexible door pulling member comprising;
 (a) latch socket means having a latch socket formed therein,
 (b) latch retaining means in said latch socket, said latch retaining means comprising a pair of latch retaining members mounted one at either side of said socket for movement to and fro between a first position and a second position, said first position being one in which the latch retaining members are located more closely adjacent one another than they are when in the second position and first biasing means communicating with said latch retaining members and normally urging them toward said first position,
 (c) latch plug means adapted to mat with said latch socket,
 (d) catch means movably mounted on said latch plug and adapted to be connected to said flexible door pulling member so as to be movable in response to winding in of said door pulling member to move to an extended position in which, when the latch plug is seated in the latch socket, it will interlock with the latch retaining means to lock the latch plug in said latch socket, and which is operable in response to paying out of the door pulling member to release the catch means from the latch retaining means to permit removal of the latch plug from the latch socket.

2. A latch as claimed in claim 1, wherein said latch socket means has a front end through which said socket opens, and said latch retaining members are slidably mounted for movement along inclined paths which converge toward the front end of the socket to locate said latch retaining members in said first position.

3. A latch as claimed in claim 1, wherein said latch socket means has a front end and a back end, and wherein guide means is located in the socket between said latch retaining means and the back end of said socket for guiding the flexible door pulling member into and through said socket.

4. A latch as claimed in claim 3, wherein said socket means comprises a top wall and a bottom wall, and said latch retaining members comprise a pair of pins which extend between said top and bottom walls and have their opposite ends slidably mounted in slots formed in the top and bottom walls, said slots being angularly inclined with respect to one another and arranged to converge toward the front end of said socket.

5. A latch as claimed in claim 4, wherein said first biasing means comprises a tension spring which has opposite ends connected to said pins and is arranged to extend therebetween.

6. A latch for powered door assemblies of the type having a winch for winding in and paying out a flexible door pulling member comprising;
   (a) latch socket means having a latch socket formed therein,
   (b) latch retaining means in said latch socket,
   (c) latch plug means adapted to mate with said latch socket, said latch plug having a distal end and a proximal end,
   (d) a pair of latch levers pivotally mounted on and arranged one on either side of said latch plug, each latch lever having an outer end projecting from its pivotal connection toward the distal end of the plug, the outer end of each lever being shaped to interlock with said latch retaining means, said lever means being mounted to pivot between a retracted position in which they are located sufficiently close to one another to permit the outer ends thereof to enter the socket to be located inwardly of said latch retaining means and an extended position in which the outer ends of the latch levers engage and interlock with the latch retaining means,
   (e) latch lever biasing means connected to the latch levers and operable to bias the latch levers toward the retracted position, and
   (f) locking means slidably mounted on said latch plug for movement toward and away from the distal ends of the plug between a locking position and a release position, said locking means cooperating with said latch levers to move the latch levers from their retracted position to their extended position in response to movement of the locking means from its released position to its locking position, said locking means being connectable to the flexible door pulling member so as to be movable from its retracted position to its extended position in response to winding in of said flexible door pulling member.

7. A latch as claimed in claim 6, wherein the flexible door pulling member has a first end connected to the locking means of said latch plug and having a sufficient extent to extend into said latch socket to engage said guide means and having a second end connectable to a winch of a powered door assembly such that when the winch is operated to wind in the flexible door pulley member as aforesaid, the pulling load applied thereto will force the locking means to slide to its locking position causing the locking levers to be located in an extended position and will drawn the latch plug into the socket to cause the outer ends of the latch levers to deflect the latching pins away from one another to permit the outer ends of the latch levers to be located inwardly of the latch pins, said second biasing means being effective to urge the latching pins inwardly to their inner position when the outer ends of the lever arms are located inwardly of the latching pins, said latch lever biasing means being operable when the pulling load is released to cause the outer ends of the lever arm to pivot to their retracted position so as to move away from their interlocking position with respect to the latching pin to permit withdrawal of the latch plug from the latch socket.

8. A latch for a powered door assembly of the type which has a winch for pulling the door to a closed position comprising;
   (a) a latch socket housing having a socket formed therein, said socket having a front end and a back end, a pair of latch pins slidably mounted in said housing, one on either side of said socket for movement along inclined planes which converge toward the front end of the socket between a first position which is located toward the front end of the socket and a second position located toward the back end of the socket, said first position being one in which the retainer members are arranged more closely adjacent one another than they are when in the second position, first biasing means for biasing said retainer members toward said first position, and guide means located in said socket between the latch pins and the back end of the socket,
   (b) a latch plug having a proximal end and a distal end, attachment means at the proximal end for attaching the latch plug to a movable door, said distal end being proportioned to fit within said socket and having side edges which converge in a direction from the proximal end to the distal end, said side edges being arranged and proportioned to deflect said latch pins away from one another to admit the plug member to the socket, latch lever means pivotally mounted on the latch plug, one at either side of the latch plug, each latch lever having an outer end projecting from its pivotal connection toward the distal end of the plug and an inner end projecting toward the proximal end of the plug, the outer end of each lever being adapted to interlock with a locking pin when located inwardly thereof in said socket, said lever members being capable of pivoting between a retracted position in which they are located sufficiently close to one another to permit the outer ends thereof to enter the socket to be located inwardly of the latch pins and an extended position in which the outer ends of the lever engage and interlock with the latch pins to retain the plug in the socket, second biasing means engaging said latch levers and urging them toward said retracted position, (c) locking means slidably mounted in said latch plug for movement toward and away from the distal end of the plug between a locking position and a release position, said locking means cooperating with said latch levers to move the latch levers from their retracted position to their extended position in response to movement of the locking means from its released position to its locking position, and (d) flexible door pulling means having a first end connected to said locking means, said flexible door pulling means extending into said socket to engage said guide means and having a second end connectable to a winch of the powered door assembly, such that when the winch is operated to wind in the flexible door pulling member, the pulling load applied thereto will force the locking means to slide to its locking position causing the locking levers to be located in their extended position and will draw the latch plug into the latch socket to cause the outer ends of the latch levers to deflect the latch pins away from one another to permit the outer ends of the latch levers to be located inwardly of the latch pins, said second biasing means being effective to urge the latching pins inwardly to their inner position when the outer ends of the lever arms are located inwardly of the latching pins, said second biasing means being operable when the pulling load is released to cause the outer ends of the lever arms to pivot to their retracted position so as to move away from their interlocking position with respect to the latching pins to permit withdrawal of the latch plug from the latch socket.

9. A latch as claimed in claim 6, wherein said latch plug has side edges which converge in a direction from the proximal end to the distal end, said side edges being arranged and proportioned to deflect said latch retaining means away from one another to admit the latch plug to said latch socket.

* * * * *